United States Patent
Blackman et al.

(10) Patent No.: US 10,495,019 B2
(45) Date of Patent: Dec. 3, 2019

(54) VARIABLE OUTPUT FUEL PUMP HAVING A BLDC MOTOR AND CONTROL MODULE THEREFOR

(71) Applicant: Carter Fuel Systems, Logansport, IN (US)

(72) Inventors: Troy Blackman, Fulton, IN (US); Wally Gebhardt, Logansport, IN (US); Dan Vandre, Kokomo, IN (US)

(73) Assignee: CARTER FUEL SYSTEMS, Logansport, IN (US)

( * ) Notice: Subject to any disclaimer, the term of this patent is extended or adjusted under 35 U.S.C. 154(b) by 31 days.

(21) Appl. No.: 15/968,336

(22) Filed: May 1, 2018

(65) Prior Publication Data

US 2019/0128207 A1 May 2, 2019

Related U.S. Application Data

(60) Provisional application No. 62/492,527, filed on May 1, 2017.

(51) Int. Cl.
*F02D 41/30* (2006.01)
*F02M 59/20* (2006.01)
(Continued)

(52) U.S. Cl.
CPC ............ *F02D 41/3082* (2013.01); *F02C 9/26* (2013.01); *F02C 9/30* (2013.01); *F02D 41/02* (2013.01);
(Continued)

(58) Field of Classification Search
CPC .......... F02D 41/20; F02D 41/02; F02D 41/24; F02D 41/28; F02D 41/3802; F02D 41/26;
(Continued)

(56) References Cited

U.S. PATENT DOCUMENTS

| 8,932,026 B2 * | 1/2015 | Akita ................. F02D 41/3082 417/2 |
| 2003/0121503 A1 * | 7/2003 | Frank .................... F02D 33/006 123/497 |

(Continued)

FOREIGN PATENT DOCUMENTS

EP        1031716 A2    8/2000

OTHER PUBLICATIONS

The International Search Report and Written Opinion of the International Searching Authority for PCT/US2018/030471, date completed Jul. 29, 2018, dated Aug. 10, 2018.

*Primary Examiner* — George C Jin
(74) *Attorney, Agent, or Firm* — Miller Canfield Paddock and Stone; Mark L. Maki (57) ABSTRACT

A variable output fuel pump includes a BLDC motor and a control module to supply three power phases A, B and C to the motor, wherein the control module connects to a power supply connection of a vehicle, and to a vehicle communications network such as a CANbus to control operation of the BLDC motor. The motor is driven by a motor driver that is connected to a micro-controller and in turn, the micro-controller is connected to a communications or CANbus I/F module. In this manner, the micro-controller can be operated by the vehicle control system such as an engine control unit (ECU) through a connection with the vehicle CANbus or other vehicle communications network. The motor driver also detects characteristics of the power used in the three power phases of the motor so that the system is operated with or without motor sensors located within the motor. By connection to the vehicle CANbus or other vehicle communications network, the vehicle ECU can be used to remotely control the fuel pump motor speed and other operational (Continued)

parameters of the motor to thereby provide a variable operate fuel pump.

20 Claims, 4 Drawing Sheets

(51) Int. Cl.
    *F02D 41/02*           (2006.01)
    *F02D 41/24*           (2006.01)
    *F02D 41/28*           (2006.01)
    *F02C 9/26*            (2006.01)
    *F02C 9/30*            (2006.01)
    *H02P 5/46*            (2006.01)
    *F02D 41/20*           (2006.01)
    *H02P 6/08*            (2016.01)
    *F02D 41/26*           (2006.01)
    *F02M 37/08*           (2006.01)

(52) U.S. Cl.
    CPC ............. *F02D 41/20* (2013.01); *F02D 41/24* (2013.01); *F02D 41/26* (2013.01); *F02D 41/28* (2013.01); *F02D 41/3005* (2013.01); *F02M 37/08* (2013.01); *F02M 59/20* (2013.01); *H02P 5/46* (2013.01); *H02P 6/08* (2013.01); *F02D 2200/0602* (2013.01); *F02M 2037/082* (2013.01)

(58) Field of Classification Search
    CPC ............. F02D 41/3005; F02D 41/3082; F02D 41/3836; F02D 41/221; F02D 2200/0602; F02D 33/006; F02M 37/00; F02M 37/0047; F02M 37/10; F02M 59/20; F02C 9/26; F02C 9/30; H02P 5/06; H02P 5/08; H02P 7/29; H02P 29/032
    See application file for complete search history.

(56) References Cited

U.S. PATENT DOCUMENTS

| | | |
|---|---|---|
| 2005/0284448 A1 | 12/2005 | Forgue et al. |
| 2008/0252242 A1* | 10/2008 | Akama ................. H02P 6/06 318/400.14 |
| 2009/0224714 A1 | 9/2009 | Serizawa et al. |
| 2011/0080062 A1* | 4/2011 | Noh ....................... H02K 3/522 310/71 |
| 2013/0187584 A1* | 7/2013 | Calnek ................. H02P 6/08 318/400.21 |

\* cited by examiner

VARIABLE OUTPUT FUEL PUMP HAVING A BLDC MOTOR AND CONTROL MODULE THEREFOR

CROSS REFERENCE TO RELATED APPLICATIONS

This application claims priority of U.S. Provisional Patent Application Ser. No. 62/492,527, filed May 1, 2017, the disclosure of which is incorporated herein by reference in its entirety.

FIELD OF THE INVENTION

The invention relates to a variable output fuel pump for vehicular applications for pumping of fuel, and more particularly relates to a fuel pump that may include a brushless DC (BLDC) motor assembly having an improved motor control module that communicates with a vehicle communication network such as a CANbus for controlling and varying the motor speed and resultant pump output.

BACKGROUND OF THE INVENTION

In conventional motor vehicles with internal combustion engines, a fuel pump is provided to pump fuel that is transferred from a storage tank to an internal combustion engine. Many types of fuel pumps are known, and one common type of pump uses a brushless DC (BLDC) motor drive to effect rotation of a rotor and drive the associated pump. In these fuel pumps, a power supply is connected to the motor assembly, wherein the motor assembly may include a circuit board assembled within the pump to control rotation of the rotor and drive the pump. In some BLDC motor designs, sensors may be provided to control operation of the BLDC motor. In other designs, the motor may be designed to operate without sensors by detecting operating performance of the BLDC through the control circuit operating the motor.

In conventional fuel pump systems, the pump is designed to operate at a fixed output that supports the maximum fuel flow demand of the engine. At all other times of less than maximum demand, the pump continues to operate at the same output level with excess fuel recirculated against a pressure relief valve back to the tank. The present invention enables the fuel pump output to be regulated to match the engine demand for fuel. Reducing pump output (speed) reduces electrical load on the vehicle charging system as well as reducing noise generated by the pump. The exemplary case is at engine idle condition, when fuel demand, ambient sound, and vehicle charging system output are all at the lowest due to low engine speed. In this condition, it is advantageous to slow the pump output (speed) to reduce load on the vehicle charging system electrical load and to minimize noise generation.

Therefore, it is an object of the invention to provide a variable output fuel pump, such as a sensorless BLDC fuel pump, having an improved motor assembly and an improved motor control module to allow the BLDC motor to operate through communication with a vehicle communications network such the main CANbus to provide a variable fuel supply to an engine that is regulated based upon engine requirements such as fuel flow or pressure.

In this regard, the invention relates to a fuel pump like those used in vehicular applications for pumping of fuel to an internal combustion engine, wherein the output of the inventive fuel pump is controlled or regulated by the engine control unit (ECU) or other computer control module depending upon engine requirements such as fuel pressure or flow. While the invention relates to an improved fuel pump, the invention is not so limited, wherein the improvements relate to advancements made to the motor control module that controls operation of a sensorless BLDC motor drive unit that connects to a vehicle communication network, such as a CANbus, to allow control through an engine control unit (ECU) disposed remote from the motor unit. The invention also relates to the BLDC motor control module which may have other applications in addition to use in a fuel pump or any other pump assembly.

Generally, the motor control module is used to control rotation of a rotor within the motor stator. The motor control module includes various electronic circuitry and controlling devices integrated into a circuit board that is mounted within the BLDC motor. The BLDC motor preferably is a sensorless BLDC motor which is operated based upon performance characteristics of the motor such as back emf, although the motor may include sensors such as Hall effect sensors to permit operation by the control module based upon the performance characteristics detected by the sensors. In either case, the motor control module selectively energizes the motor windings based upon the performance characteristics, and when energized, the stator creates varying electro-magnetic fields that interact with rotor magnets and thereby drives the rotor.

In the present invention, an inventive motor control module is connected to the BLDC motor to supply three power phases A, B and C to the motor. The control module is electrically connected to a main connector, wherein the main connector comprises a power supply connection that connects to a power supply such as that supplied by the battery or other power supply of a vehicle, and further comprises a vehicle network connection such as a CANbus connection that connects to a main vehicle communications network such as a vehicle CANbus or the CAN network of the vehicle. It will be understood that the vehicle communications network and ECU may use other communications protocols such as LIN or PWM besides the CANbus protocol. The motor control module interacts with these power supply and vehicle network connections to control operation of the BLDC motor.

In more detail, the power supply connects to a switch configuration that receives the main power supply and then defines three power supply lines which essentially define three power phases A, B and C supplied to the motor. The switch configuration operatively communicates with and is controlled by a motor driver such that motor operation is controlled based upon the motor performance characteristics preferably monitored or detected without relying upon separate sensors in the motor. However, it will be understood that the switch configuration also may drive a BLDC motor having motor sensors provided therein, such as Hall effect sensors which supply signals associated with the motor performance characteristics, such that motor operation is controlled by the motor driver based upon the performance characteristics detected or monitored by the motor sensors.

Generally, the motor driver is connected to a micro-controller and in turn, the micro-controller is connected to a vehicle network I/F module such as a CANbus I/F module. In this manner, the micro-controller can be operated by the vehicle control system preferably through a connection between the CANbus I/F module and the vehicle CANbus or any other suitable vehicle communication network which may use a different communications protocol as referenced above. In the illustrated embodiment, the CANbus module preferably is a CANbus transceiver that connects to a CANbus connector circuit, wherein the vehicle ECU and CANbus control operation of the micro-controller. The micro-controller may provide a motor control signal to the motor driver, wherein the motor driver operates based upon such motor control signal and thereby sequentially controls the power switches to control operation of the three power phases A, B and C to generate a variable motor speed which governs the resultant fuel pump output. Due to the variable motor speed, the pump output is also variable. As such, the variable output of the fuel pump is controlled by the engine control unit or ECU that is connected to the motor control module through the vehicle communications network so that the pump output is regulated based upon engine requirements.

In the illustrated embodiment, the motor driver also detects the performance characteristics of the power used in the three power phases of the motor so that the system preferably is operated without motor sensors located within the motor. For example, the motor driver can detect and monitor the back emf of the motor to thereby determine the motor speed. The motor performance characteristic, such as speed, can then be used to generate a feedback control signal that is communicated to the micro-controller which may then be used to modify and adjust the motor control signal. Further, the vehicle network I/F module can allow a stop signal to be communicated to the micro-controller. If desired, the direction of motor rotation can also be reversed. Still further, the micro-controller can communicate or transmit diagnostic information through the vehicle communications network to the engine control unit (ECU) or similar vehicle computer for further processing.

By connection to the vehicle communications network and ECU, this system allows the vehicle ECU to remotely control the fuel pump speed and output in response to fuel flow or pressure commands governing engine operation. If desired, service personnel can also adjust the pump operation such by remote adjustment of the speed, pump direction, and turn the pump on or off for maintenance.

Other objects and purposes of the invention, and variations thereof, will be apparent upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
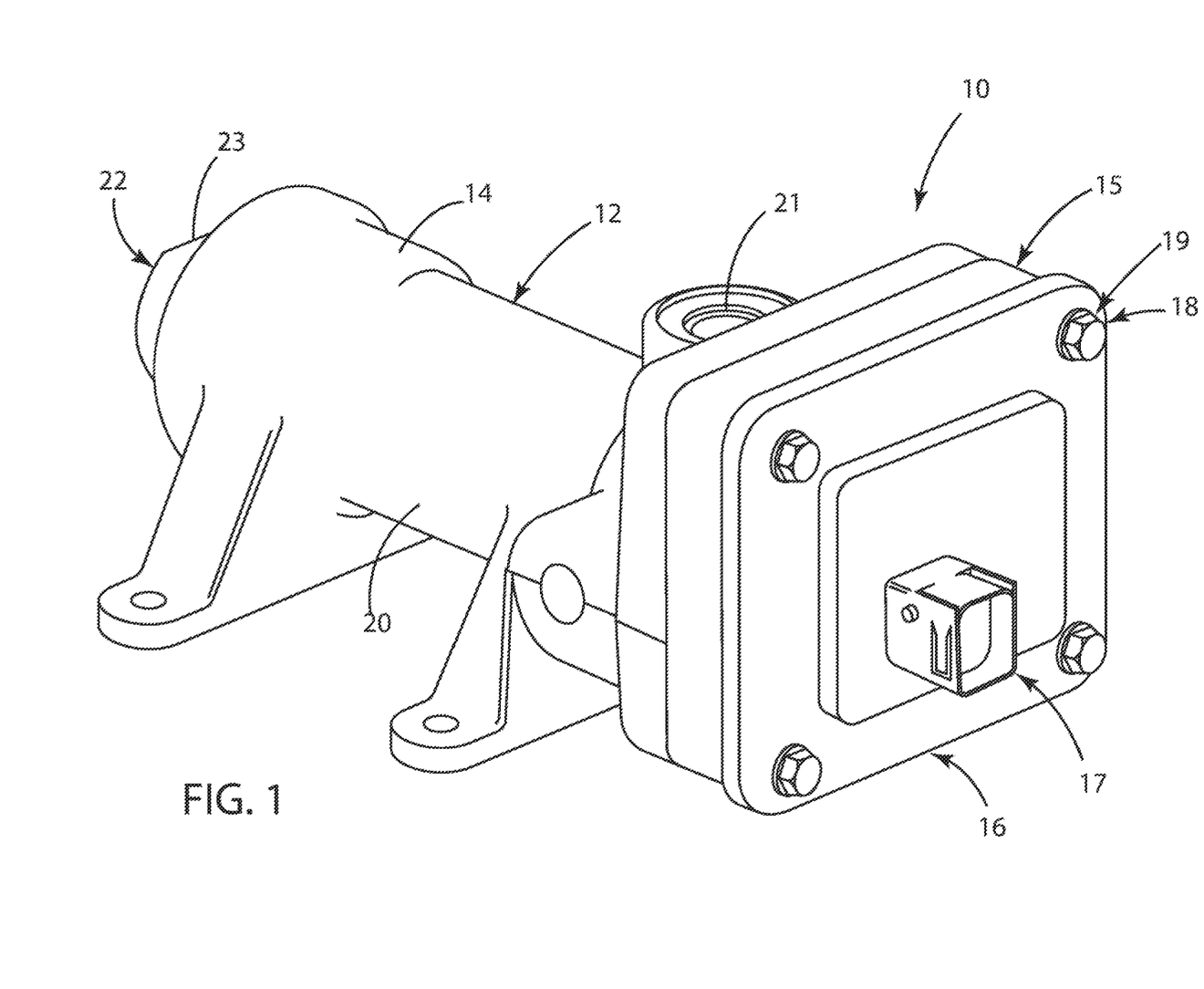
FIG. 1 is a perspective view of a sensorless BLDC fuel pump of the present invention.

Referring to FIG. 1, the invention relates to a variable output fuel pump 10, which preferably is of the type used in vehicular applications for pumping of fuel that is transferred from a storage tank to an internal combustion engine. As described below, the fuel pump includes a brushless DC (BLDC) motor drive unit 12 having an improved motor control module which operatively connects to and is controlled by the engine control unit (ECU) 13 (FIG. 3) by a vehicle communications network 13A such as the CANbus and CAN network of a vehicle for controlling and varying the motor speed and resultant pump output as described herein. As such, the pump output can be regulated in response to fuel flow or pressure commands governing engine operation. It will be understood that the pump 12 may be used for purposes other than transferring fuel, and the novel aspects of the invention relating to driving of the BLDC motor drive unit 12 can be used fully apart from and without any reference to the fuel pump 10 or a pump assembly.

Turning first to one preferred example of a BLDC fuel pump 10 as illustrated in FIG. 1, the fuel pump 10 generally comprises a pump housing assembly 14, a pump controller housing 15, and an end cover 16 with a molded in connector 17, wherein the end cover 16 is secured in place by suitable bolts 18 and washers 19. The pump housing assembly 14 generally comprises a pump housing 20 having a pump inlet 21, and a pump outlet 22 defined by an outlet housing or end cover 23 attached to the pump housing 20.

Figure 2A:
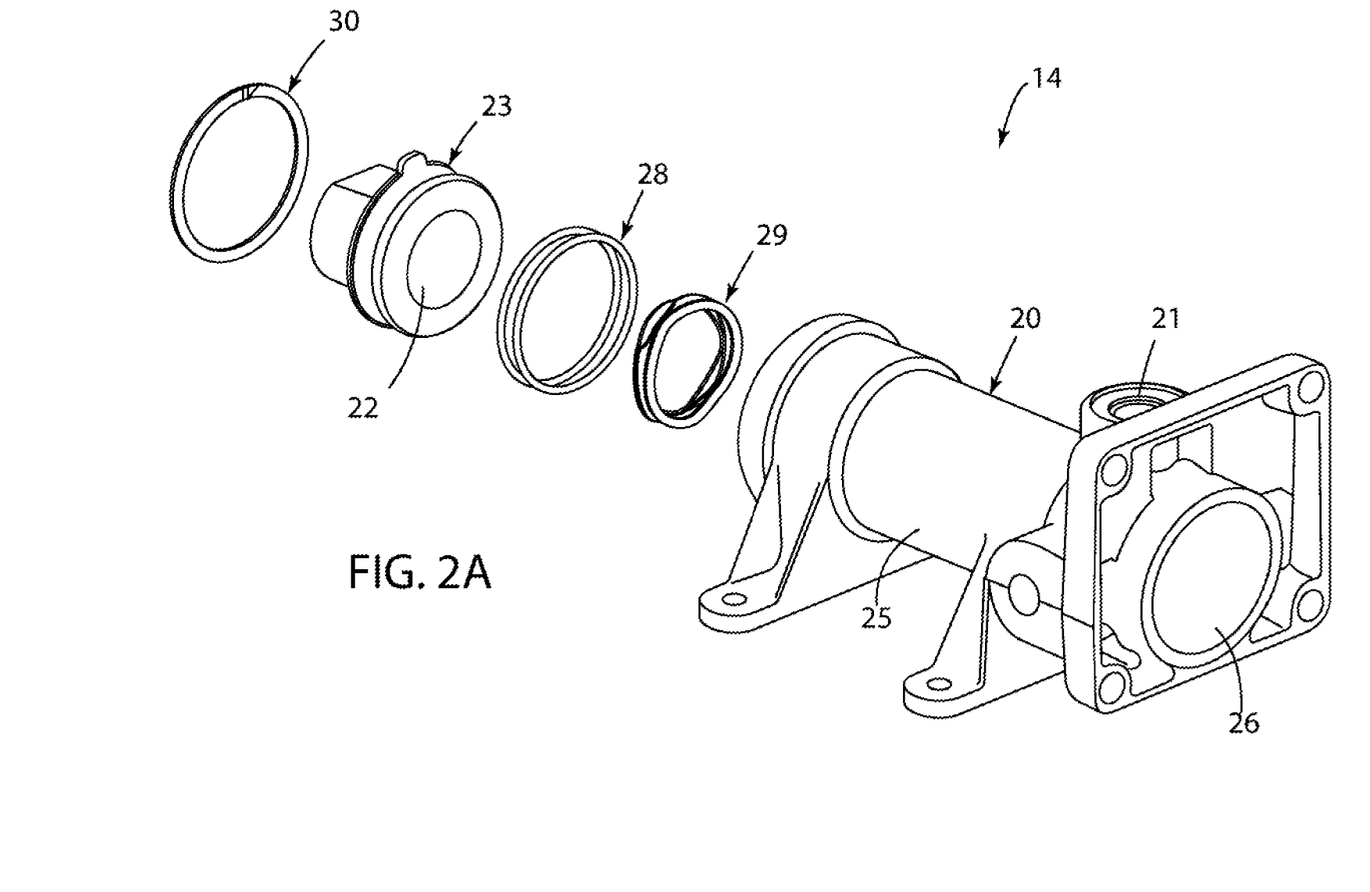
FIG. 2A is an exploded view of the fuel pump illustrating a housing assembly for the BLDC fuel pump of FIG. 1.

In more detail as to FIG. 2A, the pump housing assembly 14 includes the pump housing 20 having a hollow, cylindrical main body 25 which defines a pump chamber 26 that opens axially from both of its opposite ends. The main body 25 includes the pump inlet 21 which opens radially into the pump chamber 26 to allow fuel or other process fluid to be received therein. The outlet end of the pump chamber 26 is partially closed by the outlet housing 23 that attaches to the respective outlet end of the main body 25. The outlet housing 23 removably attaches to the main body and is sealed by gaskets or O-rings 28 in combination with the resilient biasing means 29 preferably formed as a wave spring. An internal retaining ring 30 is also provided to secure the outlet housing 23 on the pump housing 20. After pre-assembly of these components, the pump inlet 21 opens axially from the end nearest the inlet 21.

Figure 2B:
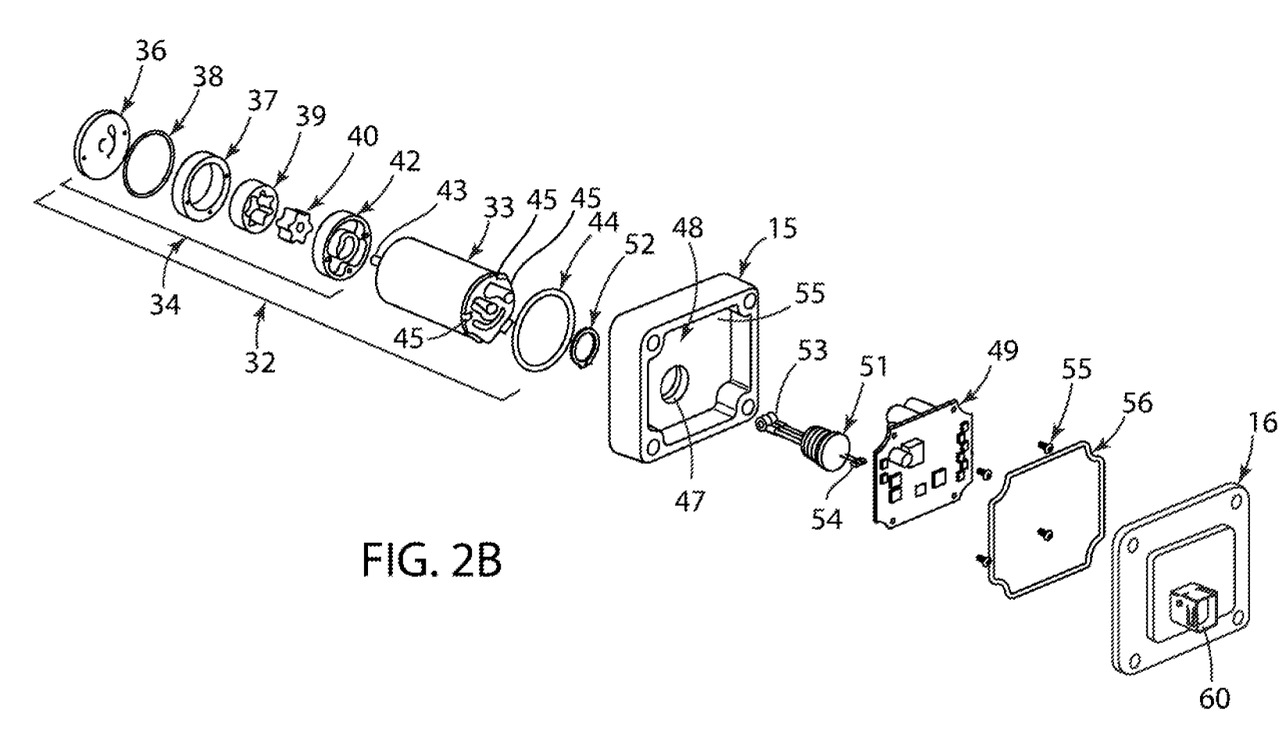
FIG. 2B is an exploded view of the fuel pump illustrating a pump assembly and control module for the BLDC fuel pump.

Referring to FIG. 2B, the pump housing 20 is configured to receive a pump unit 32 which includes and is driven by a brushless DC (BLDC) motor 33. The motor 33 preferably is a sensorless BLDC motor. The motor 33 is drivingly connected to and rotatably drives a pump assembly or pump unit 34 attached to one end of the motor 33. The pump assembly 34 preferably is configured as a gear pump assembled from an outlet port plate 36 joined with an eccentric ring 37 having an O-ring 38 sandwiched therebetween. The eccentric ring 37 surrounds an outer gear 39 and an inner gear 40 which are movably captured within the eccentric ring 37 by an inlet port plate 42. The motor 33 includes a drive shaft 43 that extends through the inlet port plate 42 to rotate the inner gear 40 and outer gear 39 to effect pumping by the pump assembly 34, wherein the fuel or other process fluid enters the inlet 21 of the pump housing 20 and is pumped out of the outlet 22.

During assembly, the entire pump assembly 34 is slid axially into the pump chamber 26 and sealingly confined therein by attachment of the controller housing 15 to the end of the pump housing 20. The joint therebetween is sealed by the O-ring 44. To supply power to the motor 33, the motor 33 includes three motor terminals 45 corresponding to three power phases designated as phase A, phase B and phase C. The motor terminals 45 are sequentially supplied with power or energized when the motor 33 is connected to a 3 phase power supply. As a result, the selective energization of the motor terminals 45 rotates a rotor relative to a stator provided within the motor 33. The brushless BLDC motor 33 is of a sensorless type wherein commutation of the 3 phases (A, B and C) is controlled without the need of internal sensors within the motor 33 as will be described in more detail herein. It will be understood, however, that the motor 33 used in the present invention may have alternate constructions, such as those motor designs that use sensors such as Hall effect sensors to control motor rotation.

While the motor assembly 32 is essentially enclosed within the pump chamber 26 (FIG. 2A) by the controller housing 15, the controller housing 15 also includes a power port or wiring port 47 that passes between the pump chamber 26 and a generally box-like compartment or chamber 48 defined by the controller housing 15. The compartment 48 is provided to store a PCBA or pump controller or motor control module 49 as described below. The motor control module 49 generally comprises a printed circuit board unit with electronic devices mounted thereto.

To power the pump 33, a pass-through wire harness 51 is provided which seats within the power port 47 and is held in place by an external retaining ring 52. The power port 47 includes three supply cables 53 that are connected to the motor terminals 45 by suitable electrical connectors to supply power to the motor 33. Further, the wire harness 51 includes three feed cables 54 that connect to the motor control module 49 so that the motor control module 49 can control the sequential energization or supply of power to the three motor phases A, B and C to control commutation of these three phases.

The motor control module 49 is secured to the controller housing 15 by suitable screws 55, and then is sealed in and enclosed by the end cover 16 that connects to the housing body 55 by additional fasteners. A cover seal or gasket 56 is sandwiched between the housing body 55 and end cover 16 so that the controller housing 15 seals the motor control module 49 within the controller compartment 48. The end cover also includes a main connector 60 that accepts a plug assembly (not shown) that includes both a power supply connector, such as from the battery of a vehicle, and a vehicle communications network connector, that preferably is provide in the form of a CANbus connector that connects to the CANbus or CAN network of the vehicle. While the present invention preferably would use the CANbus protocol, it will be understood that the vehicle communications network may use other suitable protocols such as LIN or PWM. As a result, the vehicle CANbus or other vehicle communications network is operatively and electrically connected to the motor control module 49 to control operation of the pump 33 and vary the pump output.

Generally as to operation of the motor 33, the motor 33 includes the stator that may also comprise a plurality of windings or sets of windings that define the motor phases A, B and C. The motor terminals 45 are electrically connected to the motor windings via appropriate connections. When energized, the stator creates an electro-magnetic field in the manner typical of BLDC motors that interact with magnets provided on the rotor to effect rotation of the motor shaft 43 that preferably forms part of the rotor. The rotor is operatively coupled to and carried by the shaft 43 and is disposed for powered rotation within the stator in response to the electro-magnetic field generated by the stator and the windings thereof. The speed of rotation of the rotor shaft 43 thereby governs pumping of fuel through the fuel pump 10, wherein varying the motor speed varies the fuel output from the fuel pump 10.

It will be understood the motor 33 may have different configurations such as different configurations of magnets or windings. Generally, the motor 33 is a BLDC motor type and is sensorless so that the motor control module 49 does not rely upon the detection of separate sensors within the motor 33 itself. Rather, the present invention makes use of a motor control module 49 which senses the power supply and the performance characteristics of the motor 33 to vary the energization of the motor phases to effect rotor rotation. While the BLDC motor 33 preferably is a sensorless BLDC motor which is operated based upon performance characteristics of the motor 33 such as back emf, it will be understood by the skilled artisan that the motor may include sensors such as Hall effect sensors to permit operation of the motor 33 based upon the performance characteristics detected by the sensors. In either case, the motor control module 49 selectively energizes the motor windings based upon the performance characteristics, and when energized, the stator creates varying electro-magnetic fields that interact with rotor magnets and thereby drives the rotor and rotor shaft 43.

Referring to FIG. 2B, the motor control module 49 preferably is constructed from one or more layers of substrate that defines a plurality of electrical circuits, components and devices. The motor control module 49 preferably is formed from the multiple layers wherein top and bottom surfaces shown in FIG. 2B include various electronic devices that govern and control the operation of the motor 33 by controlling the energization of the motor windings referenced above.

Figure 3:
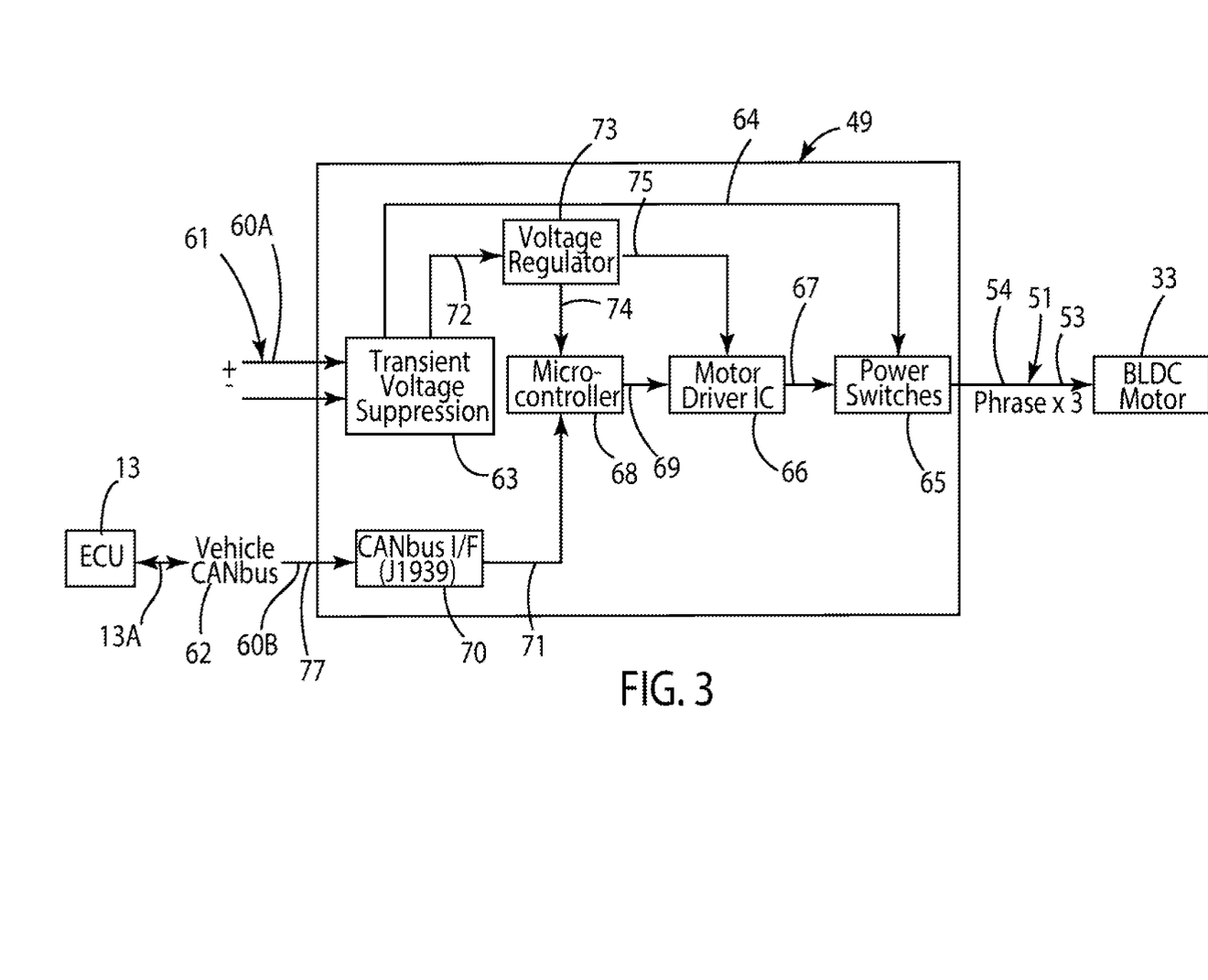
FIG. 3 is a diagrammatic view of a motor control module for the motor assembly connected to a vehicle communications network and ECU of the vehicle.

Referring next to the circuit diagram of FIG. 3, the motor control module 49 is diagrammatically shown so as to be connected to the sensorless BLDC motor 33 by the wire harness 51 having the supply cables 53 and feed cables 54. The feed cables 54 are connected to the motor control module 49 to supply the three power phases A, B and C to the motor 33. As noted above, the motor control module 49 is electrically connected to the main connector 60. As depicted in FIG. 3, the main connector 60 comprises a power supply connection 60A that connects to the positive and negative terminals of a main power supply 61 such as that supplied by the battery or other power supply of a vehicle. Further, the main connector 60 comprises a vehicle network connection 60B that preferably is CANbus connection that connects to a main vehicle communications network 13A such as the vehicle CANbus designated by reference numeral 62. It will be understood that the vehicle communications network 13A and ECU 13 may use other communications protocols such as LIN or PWM besides the CANbus protocol described herein.

The motor control module 49 in turn interacts with these power and CANbus connections 61 and 62 to control operation of the BLDC motor 33 through the ECU 13. To supply power to the various components of the motor control module 49 as well as the motor 33, the power supply connection 60A at the main connector 60 is electrically connected to a transient voltage suppression (TVS) module 63 to protect the downstream circuit components from damaging voltage transients. The TVS module 63 includes a first power supply circuit 64 that connects to a plurality of power switches which preferably comprise a plurality of MOSFETs and essentially define a switch configuration or switching device 65.

Preferably, the power supply circuit 64 supplies a motor power supply to the motor 33 at a voltage and current suitable to operate the motor 33. The motor power supply may be that power that is supplied by the main power supply connection 61 or possibly a regulated voltage which is set depending upon the operating requirements of the motor 33. Preferably, the switch configuration 65 receives the main power supply and then defines three power supply lines connected to the wire harness 51, wherein the three supply lines essentially define the three power phases A, B and C. The switch configuration 65 is controlled to sequentially supply the three power phases by connection of the switch configuration 65 to a motor driver 66 through a switch connection circuit 67. The motor driver 66 preferably is a BLDC motor controller that controls the motor 65 without relying upon separate sensors to indicate motor characteristics. As such, the motor driver 66 may monitor performance characteristics of the motor 33 such as the back emf from the motor 33. As disclosed above, however, the motor 33 may include sensors that supply signals to the motor driver 66 such that the motor driver 66 may rely upon sensor signals that indicate the performance characteristics of the motor 33.

Generally, the motor driver 66 is connected to a micro-controller 68 by a controller circuit 69 that permits two-way communication with the motor driver 66. In turn, the micro-controller 68 is connected to a network interface module 70 that preferably is a CANbus I/F module through a CANbus interface connector circuit 71. In this manner, the micro-controller 68 can be operated by the vehicle control system through a connection with the vehicle communications network 13A which in the illustrated, preferred embodiment is the vehicle CANbus 62.

In more detail, the main power supply is also routed from the TVS module 63 through a power circuit 72 to a voltage regulator 73. From the voltage regulator 73, a first supply circuit 74 supplies a regulated supply voltage to the micro-controller 68, and a second supply circuit 75 supplies a regulated supply voltage to the motor driver 66.

To provide CANbus control of the micro-controller 68, the CANbus network interface module 70 preferably is a CANbus transceiver that connects to a CANbus connector circuit 77 that preferably communicates with the CANbus high level and low level signals of the vehicle CANbus 62. In turn, the CANbus connector circuit 71 permits communication, including the transmission and reception of the CANbus signals, between the CANbus module 70 and micro-controller 68, which in turn allows the vehicle CANbus to control operation of the micro-controller 68. As noted previously, the vehicle communications network 13A may use other protocols, such as LIN or PWM, which would allow communications between the vehicle ECU 13 and the micro-controller 68 through the network interface module 70 and the connector circuit 71.

By communicating with the network interface module 70, the micro-controller 68 can exchange two-way communication of input and output signals with the motor driver 66. The micro-controller 68 preferably may provide a pulse width modulation (PWM) signal or other motor control signal to the motor driver 66 through motor control circuit 69. The motor driver 66 operates based upon such motor control signal which preferably is a PWM signal through the controller circuit 69, and thereby sequentially controls the power switches in the switch configuration 65 through the switch connection circuit 67 to control operation of the three power phases A, B and C that operate the motor 33.

With respect to the sensorless operation of the motor 33, the motor driver 66 also detects performance characteristics of the power used in the three power phases of the motor 33. For example, the motor driver 66 can detect and monitor the back emf of the motor 33 to thereby determine the motor speed. The motor characteristic, such as speed, can then be used to generate a feedback control signal that is communicated to the micro-controller 68 which may then be used to modify and adjust the motor control signal such as the PWM signal sent to the motor driver 66 to vary operation of the motor 66 to maintain a preferred pump output. Preferably, the motor driver 66 is able to control the speed of the motor 33 based upon the signals received form the CANbus module 70.

By connection to the vehicle CANbus 62 and vehicle communications network 13A, this system allows the ECU 13 to remotely control the motor speed which varies the resultant output of the fuel pump 10. The ECU 13 can thereby regulate the pump output in response to engine commands such as fuel pressure or flow. In operation, the micro-controller 68 can be operated by the vehicle control system preferably through a connection between the network interface module 70 and the vehicle communications network 13A, wherein the vehicle ECU 13 controls operation of the micro-controller 68 The micro-controller 68 may provide a motor control signal to the motor driver 66, wherein the motor driver 66 operates based upon such motor control signal and thereby sequentially controls the power switches to control operation of the three power phases A, B and C to generate a variable motor speed which governs the resultant fuel pump output. Due to the variable motor speed, the pump output is also variable. As such, the variable output of the fuel pump 10 is controlled by the engine control unit or ECU 13.

This configuration provides advantages over known prior art fuel pump systems. When a fuel pump is merely turned on to supply fuel, the fuel pump may run at a fixed output that requires recirculation of excess fuel back to the fuel tank. This type of operation requires additional and continuous power to the fuel pump. The present invention, however, which uses a variable output fuel pump 10 controlled by the ECU 10 reduces power consumption by the motor 33, the motor 33 can operate at slower speeds when required, and the motor 33 can operate at a reduced electrical load which reduces the draw from the power charging system. When the engine is at idle, there is minimum charging since the motor 33 operates at a low speed. Further, there may be reduced emissions from the engine due to the reduced power consumption.

Further, this system allows the vehicle ECU 13 to remotely control the fuel pump speed and output, wherein if desired, service personnel can also adjust the pump operation remote from the fuel pump 10 such as by remote adjustment of the speed, pump direction, and turn the pump 33 on or off for maintenance through the ECU 13. Further, the network interface module 70 can allow a stop signal to be communicated to the micro-controller 68, which in turn can be communicated to the motor driver 66. If desired, the direction of motor rotation can be reversed. Still further, the micro-controller 68 can communicated diagnostic information to the vehicle CANbus 62 to the ECU 13 or similar vehicle computer for further processing such as the processing of OBDII faults.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A variable output fuel pump for a vehicle comprising:
a pump unit
a brushless DC (BLDC) motor drivingly connected to said pump unit wherein said motor receives a motor power supply that is variable to generate a variable motor speed that varies a resultant pump output of fluid pumped by said pump unit; and
a motor control module operatively connected to said motor, wherein said motor control module is adapted to operatively connect to and be controlled by a vehicle communications network for controlling and varying said motor speed and said resultant pump output, said motor control module including a micro-controller operatively controlling operation of said motor by controlling said motor power supply; and
said motor control module further comprising a network interface module which comprises a power supply connection connectable to power supply terminals of a vehicle power supply and comprises a vehicle network connection connectable to the vehicle communications network so as to receive control signals from the vehicle communications network, said power supply connection supplying said motor power supply to said motor, and said network interface module being operatively connected to said micro-controller for communicating said control signals therebetween which said control signals are used by said micro-controller to control operation of said motor power supply.

2. The fuel pump according to claim 1, wherein said motor control module comprises a switch configuration connected to said motor for selective, variable energization of said motor power supply, and a motor driver which is controlled by said micro-controller and controls said switch configuration.

3. The fuel pump according to claim 2, wherein said motor driver senses said motor power supply and performance characteristics of said motor during operation thereof to control said switch configuration and vary said energization of said motor power supply.

4. The fuel pump according to claim 1, wherein said vehicle communications network uses a communications protocol comprising one of a CANbus, LIN or PWM protocol.

5. The fuel pump according to claim 1, wherein said pump output is regulated in response to fuel flow or pressure commands governing engine operation communicated through said vehicle communications network.

6. The fuel pump according to claim 5, wherein an engine control unit is connected to said vehicle communications network wherein said control signals are generated by said engine control unit.

7. The fuel pump according to claim 6, wherein said engine control unit generates said control signals to control operation of an internal combustion engine, and said engine control unit thereby operates to vary operation of said fuel pump.

8. A variable output fuel pump for a vehicle comprising:
a pump unit
a brushless DC (BLDC) motor drivingly connected to said pump unit wherein said motor has a variable motor speed to vary a resultant pump output of fluid pumped by said pump unit;
a motor control module operatively connected to said motor, wherein said motor control module is adapted to operatively connect to a vehicle communications network and be controlled by an engine control unit for controlling and varying said motor speed and said resultant pump output;
said motor control module comprising:
a switch configuration connected to said motor for selectively varying energization of a motor power supply being supplied to said motor to vary said motor speed;
a motor driver which senses said motor power supply and performance characteristics of said motor during operation thereof to control said switch configuration and vary said energization of said motor power supply;
a micro-controller connected to said motor driver to control said motor driver; and
a network interface module comprising a main connector which comprises a power supply connection connectable to power supply terminals of a vehicle power supply and a vehicle network connection connectable to the vehicle communications network, said power supply connection of said main connector supplying vehicle power to said switch configuration, and said vehicle network connection being operatively connected to said micro-controller for communicating control signals therebetween and controlling operation of said motor driver in response to said control signals when generated by said engine control unit and then received from said vehicle communications network.

9. The fuel pump according to claim 8, wherein said performance characteristics of said motor include back emf and said switch configuration is controlled based upon said back emf being sensed by said motor driver.

10. The fuel pump according to claim 8, wherein said vehicle communications network is defined by a vehicle CANbus.

11. The fuel pump according to claim 8, wherein said network interface module communicates with said microcontroller such that said microcontroller can exchange two-way communication of input and output signals with said motor driver.

12. The fuel pump according to claim 11, wherein said micro-controller provides a motor control signal to said motor driver as part of said input and output signals.

13. The fuel pump according to claim 12, wherein said motor operates based upon receipt of three power phases of said motor power supply, and said motor driver operates based upon said motor control signal to sequentially control said switch configuration to control operation of said three power phases.

14. The fuel pump according to claim 8, wherein said motor operates based upon receipt of three power phases of said motor power supply, and said motor driver sequentially controls said switch configuration to control operation of said three power phases.

15. A variable output fuel pump for a vehicle comprising:
a pump unit
a brushless DC (BLDC) motor drivingly connected to said pump unit wherein said motor has a variable motor speed to vary a resultant pump output of fluid pumped by said pump unit, said motor operating based upon receipt and commutation of three power phases of a motor power supply;
a motor control module operatively connected to said motor, wherein said motor control module is adapted to operatively connect to a vehicle communications network and be controlled by an engine control unit for controlling and varying said motor speed and said resultant pump output, said engine control unit generating control signals to control operation of an internal combustion engine;

said motor control module comprising:

a switch configuration connected to said motor for selectively varying energization of said motor power supply being supplied to said motor to vary said motor speed;

a motor driver which senses said motor power supply and performance characteristics of said motor during operation thereof to control said switch configuration and vary said energization of said motor power supply, said motor driver operating based upon said motor control signal to sequentially control said switch configuration to control operation of said three power phases;

a micro-controller connected to said motor driver to control said motor driver; and a network interface module comprising a main connector which comprises a power supply connection connectable to power supply terminals of a vehicle power supply and a vehicle network connection connectable to the vehicle communications network, said power supply connection of said main connector supplying vehicle power to said switch configuration, and said vehicle network connection being operatively connected to said micro-controller for communicating control signals therebetween and controlling operation of said motor driver in response to said control signals when generated by said engine control unit and then received from said vehicle communications network, wherein said engine control unit thereby operates to vary operation of said fuel pump.

16. The fuel pump according to claim 15, wherein said pump output is regulated in response to fuel flow or pressure commands governing engine operation generated by said engine control unit.

17. The fuel pump according to claim 16, wherein said motor driver operates based upon a motor control signal received from said micro-controller to sequentially control said switch configuration to control operation of said three power phases.

18. The fuel pump according to claim 15, wherein said motor driver is sensorless so as to operate without relying upon separate sensors to indicate motor characteristics.

19. The fuel pump according to claim 15, wherein said power supply is electrically connected to a transient voltage suppression module which supplies power to said micro-controller, said motor driver and said switch configuration.

20. The fuel pump according to claim 15, wherein said network interface is a transceiver that connects to communicate signals between said micro-controller and said vehicle communications network.

* * * * *